Aug. 8, 1933.        A. T. POTTER        1,921,261
HINGE CONSTRUCTION
Filed July 13, 1931
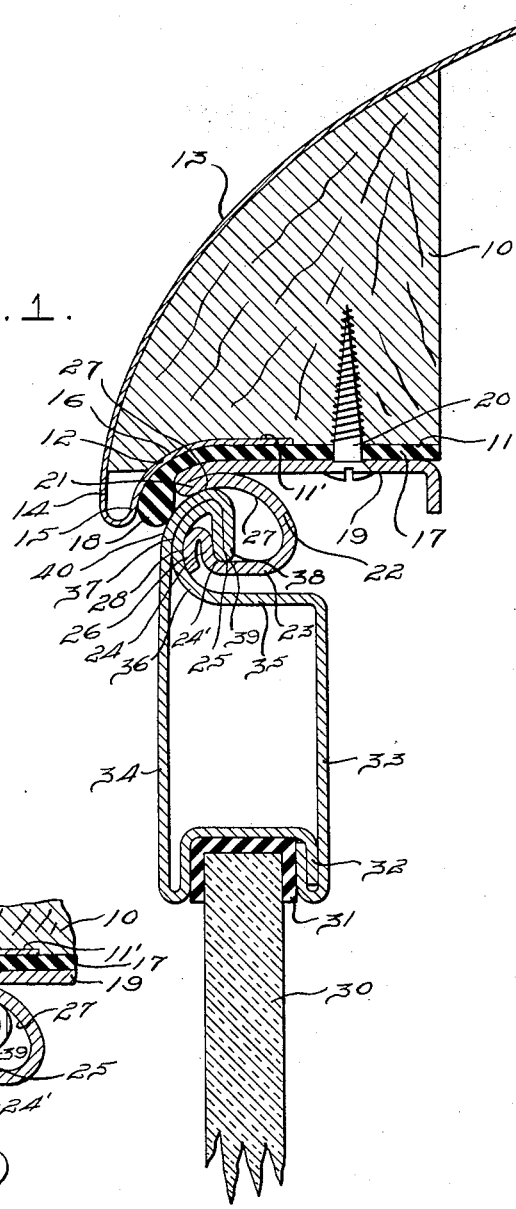
INVENTOR
Albert T. Potter
BY
Harness, Dickey, Pierce & Hann,
ATTORNEYS.

Patented Aug. 8, 1933

1,921,261

UNITED STATES PATENT OFFICE 1,921,261

HINGE CONSTRUCTION

Albert T. Potter, Detroit, Mich., assignor to Ainsworth Manufacturing Corporation, a Corporation of Michigan Application July 13, 1931. Serial No. 550,313

8 Claims. (Cl. 296—92)

The invention relates to hinge constructions and it has particular relation to a hinge for pivotally connecting one edge of a windshield to a transversely extending frame member in a motor vehicle.

In certain respects, the invention constitutes an improvement over my co-pending application, Serial No. 487,727, filed October 10, 1930.

In general the objects of the present invention are similar to the objects set forth in my co-pending application and as exemplary of such objects, to provide a hinge having complementary convolved portions whereby the use of a hinge pin is eliminated, and to provide a hinge construction having a plurality of seals which effectively make it weathertight and watertight. Additional objects of the present invention are to provide a hinge construction of the above designated character, in which the hinging elements are directly located between adjacent edge faces of the windshield and the frame member on the vehicle, for the purpose of enhancing the appearance of the vehicle and avoiding protruding parts which tend to produce whistling and other undesirable noises when currents of air are directed against the front of the vehicle; to provide a hinge construction of this character, which is so concealed that ordinarily it cannot be detected; and to provide a hinge construction in which rubber, or similar sealing means, seals the hinge connection between the windshield and the frame member and conceals certain parts of the hinge construction.

For a better understanding of the invention reference may be had to the accompanying drawing forming a part of the specification wherein:

Figure 1 is a fragmentary cross sectional view of the front part of a motor vehicle indicating the manner in which the windshield is hinged to a transverse frame member of the vehicle according to one form of the invention; and Fig. 2 is a fragmentary cross sectional view similar to that shown by Fig. 1 illustrating the manner in which the hinge permits pivotal movement of the windshield with respect to the frame member.

Referring to Fig. 1, a transverse, wood frame member 10 is illustrated, which constitutes a part of the frame of the motor vehicle, disposed above the windshield thereof. The lower face of the frame member 10 is horizontal at the rearward side of the member, as indicated at 11, while forwardly of the horizontal portion, the lower surface of the member is recessed as indicated at 11' and the base of the recess extends forwardly and downwardly in an arcuate manner as indicated at 12. A sheet metal skin 13 covers the upper surface of the frame member and projects downwardly below the forward, lower edge thereof as indicated at 14, and then is reversely bent as indicated at 15 to provide an arcuate metal flange 16 complementary to the arcuate surface 12 in the lower face of the member.

On the lower surface of the member 10, a strip of rubber 17 is disposed and this strip extends forwardly along the arcuate metal flange 16, and finally terminates in an enlarged, bead portion 18 located adjacent the forward lower edge 14 of the cover 13. The rubber is secured to the member 10 by means of a metal plate 19 extending throughout the entire length of the frame member 10, and which is secured to the latter by means of screws 20. At its forward edge and adjacent the bead 18 on the rubber 17, the metal plate 19 is reversely bent as indicated at 21 and extends arcuately a short distance substantially in contact with the plate, and then arcuately in a rearward and downward direction as indicated at 22 to provide conjointly a curved surface 27. The portion 22 merges at its lower terminus with a substantially horizontal portion 23 extending forwardly and the portion 23 terminates forwardly in a substantially, vertically directed portion 24 projecting in an upward direction. The junction of the portions 23 and 24 is arcuate and defines a substantially semi-cylindrical, inner surface 24' having a center axis indicated by the point 25. The portion 24 at its upper terminus is reversely bent as indicated at 26 in a downward, arcuate manner to provide an outer curved surface 28. In this construction, the surfaces indicated at 24', 27 and 28 are concentric to the axial line 25 although such surfaces have different radii.

The windshield is indicated at 30 and its upper edge is received in a channel, rubber guide 31 retained in a channel metal guide 32. The channel metal guide 32 is formed by suitably bending the lower portions of vertically disposed metal plates 33 and 34 projecting upwardly toward the frame member 10. At its upper terminus, plate 33 extends forwardly in a horizontal direction as indicated at 35 and then upwardly in an arcuate manner, until it contacts with the upper terminus of plate 34. Both plates then extend upwardly and rearwardly in an arcuate manner as indicated at 37, and into the opening formed between portions 21 and 24 of metal plate 19 on member 10. Inwardly of the opening, the plates 33 and 34 extend downwardly as indicated at 38 and terminate in a substantially semi-cylindrical junction 39 adapted to fulcrum on the semi-cylindrical surface 24', and having an axis coinciding with the axis 25. The outer surface of curved portion 37, as indicated at 40, has a radius of curvature substantially identical to the curvature of the surface 27 while the inner surface of such portion, and portion 36 of plate 33, have a radius of curvature substantially identical to the curvature of surface 28. The outer surface 40 of portion 37, continually contacts with the rubber bead 18.

When the windshield is pivoted about the hinged connection between it and the member 10, as illustrated in Fig. 2, the surfaces 24' and 39 will constantly engage each other because they have substantially the same axis and radius of curvature while similarly the surfaces 27 and 40 will constantly contact with each other because they have the same axis and radius of curvature. Also surface 28 on the upper hinge element will constantly contact with the inner surface of portions 37 and 36 of the lower hinge element because they have the same axis and radii of curvature. These constantly contacting surfaces between the upper and lower hinge elements provide a triple seal to prevent water and air from gaining egress into the passenger compartment of the vehicle, and also positively guide the pivotal movement of the windshield. The rubber bead 18 constantly engaging the outer surface 40 on the lower hinge element, additionally seals the hinge connection and also conceals the connection and thereby enhances the appearance of the vehicle. Also the bead 18 serves to resiliently limit pivotal movement of the windshield as shown by Fig. 2, when the straight portion of plate 34 engages the bead.

It is apparent that by locating the hinge between the upper edge of the windshield frame and the lower edge of the frame member 10, and between the side edges of the frame member 10, the hinge is concealed from view to the ordinary observer and consequently the appearance of the vehicle is enhanced considerably. The rubber bead 18 not only prevents water and air from getting into the hinge connection but also conceals any parts of the hinge connection which might otherwise be exposed to view. A hinge of this character will work silently and smoothly, will positively guide the movement of the windshield, and effectively seals the connection against water, air and the like. Also a hinge of this character avoids projecting parts characteristic of at least most prior constructions, thereby avoiding whistling and other noises caused by air currents engaging the hinge connection. In general the hinge connection is inexpensive, durable, and provides a very efficient and attractive connection between the windshield and the vehicle frame member. As is true of the hinge connection in the prior, co-pending application, the hinge elements are associated by longitudinally telescoping one part into the other.

Although only one form of the invention has been illustrated and described it will be apparent to those skilled in the art that various modifications may be made without departing from the scope of the appended claims.

I claim:

1. In combination, a windshield member hinged to a frame member, the hinge comprising parts respectively secured to the members, each of said parts having surfaces of different radii with respect to the hinge axis, the arcuate surfaces of one hinge part movably contacting respectively with corresponding arcuate surfaces of the other hinge part, and a resilient sealing element on one member resiliently contacting with an arcuate surface on the hinge element of the other member to seal the hinge throughout hinging movement.

2. In combination, a windshield member hinged to a frame member, the hinge comprising parts respectively secured to the members, each of said parts having surfaces of different radii with respect to the hinge axis, the arcuate surfaces of one hinge part movably contacting respectively with corresponding arcuate surfaces of the other hinge part, and a resilient sealing element on one member resiliently contacting with an arcuate surface on the hinge element of the other member, and means adjacent the last mentioned surface for engaging the sealing element after a predetermined movement of said other member for resiliently limiting such movement.

3. In combination, a windshield member hinged to a frame member, the hinge comprising parts respectively secured to the members, each of said parts having surfaces of different radii with respect to the hinge axis, the arcuate surfaces of one hinge part movably contacting respectively with corresponding arcuate surfaces of the other hinge part, and a resilient sealing element on one member resiliently contacting with an arcuate surface on the hinge element of the other member, and means adjacent the last mentioned surface for engaging the sealing element after a predetermined movement of said other member for resiliently limiting such movement, said means comprising a portion of the last mentioned member which is located at greater distance from the hinge axis than such arcuate surface engaging the resilient sealing element.

4. In combination, a windshield member hinged to a frame member, the hinge comprising elements respectively secured to the members, said elements having a plurality of complementary, spaced engaging surfaces of different radii with respect to a common axis, and a resilient sealing element on one member contacting with an arcuate surface on the hinge element of the other member to seal the hinge throughout hinging movement.

5. In combination, a windshield frame member, a stationary vehicular frame member along the windshield frame member, inter-engaging, companionate hinge members on the frame members respectively, having curved plate portions free of any pintle, a resilient sealing element secured to one frame member and resiliently engaging a curved plate portion on the other frame member, and means on the frame member on which the sealing element is mounted, for holding the element resiliently in contact with said curved plate portion with which it engages, during hinging movement of the windshield.

6. In combination, a windshield frame member, a stationary vehicular frame member along the windshield frame member, interengaging, companionate hinge members on the frame members respectively, having curved plate portions free of any pintle, a resilient rubber sealing element secured to one frame member and resiliently engaging a curved plate portion on the other frame member, and means on the frame member on which the sealing element is mounted, for holding the element resiliently in contact with said curved plate portion with which it engages.

7. In combination, a windshield frame member, a stationary vehicular frame member along the windshield frame member, interengaging companionate hinge members on the frame members respectively, having curved plate portions free of any pintle, a resilient sealing element secured to one frame member and resiliently engaging a curved plate portion on the other frame member, means on the frame member on which the sealing element is mounted, for holding the element resiliently in contact with said curved plate portion with which it engages, during hinging movement of the windshield, and means on the other frame member for engaging the sealing element in a manner to limit hinging movement of the shield after a predetermined degree of said movement.

8. In combination, a vehicular frame member, a windshield frame substantially in the plane of the first-mentioned frame member, interengaging arcuate plate elements connected respectively to the windshield frame and the vehicular frame member, for hinging movement free of any pintle, a projection extending longitudinally of the vehicular frame member at the outer side of the hinging element, and a resilient member connected to the vehicular frame member adjacent its hinging element and having a bead portion lying against the projection, the curved plate hinging element on the windshield frame normally contacting with such means to prevent water or the like from gaining ingress through the hinge into the vehicle.

ALBERT T. POTTER.